Oct. 23, 1956 C. L. HOGAN 2,768,354
GYROMAGNETIC RESONANCE TYPE MICROWAVE MODE CONVERTER
Filed May 26, 1951

INVENTOR
C. L. HOGAN
BY
ATTORNEY

2,768,354

GYROMAGNETIC RESONANCE TYPE MICROWAVE MODE CONVERTER

Clarence L. Hogan, Madison, N. J., assignor to Bell Telephone Laboratories, Incorporated, New York, N. Y., a corporation of New York Application May 26, 1951, Serial No. 228,379

4 Claims. (Cl. 333—21)

This invention relates to new and useful devices employing effects related to the Faraday-effect rotation of the plane of polarization of plane polarized electromagnetic waves.

An object of the invention is to selectively absorb circularly polarized components of electromagnetic wave energy having a given sense of polarization rotation.

It is a further object to employ the gyromagnetic absorption associated with the Faraday rotation in ferromagnetic materials to convert a linearly polarized wave of electromagnetic wave energy into a circularly polarized component.

The Faraday effect in the optical range has long been known. Attempts heretofore to extend the use of the effect to wavelengths longer than those of the visible spectrum, and in particular to the microwave range have been of no practical consequence because of the general weakness of the Faraday effect in substances that are transparent to visible lighter or because of excessive attenuation of waves of longer wavelength such as microwaves in suitable thicknesses of certain ferromagnetic substances such as iron where the amount of Faraday-effect rotation per unit thickness for very thin sheets that could be penetrated by light was known to be large. Published researches on the theory of ferromagnetic resonance have provided a theoretical basis from which I have been able to predict the presence of a pronounced Faraday effect in substances which exhibit this kind of resonance, for example, ferromagnetic metallic oxides. I have discovered that magnetic materials such as the ferromagnetic metallic oxides and notably nickel-zinc ferrite, in a thickness of the order of magnitude of a wavelength, are capable of producing angular rotations of the plane of polarization of plane polarized waves to the extent of 45° or 90° or more in the presence of magnetizing fields which are readily produced in practice and that these materials in such thicknesses are capable of transmitting electromagnetic waves, for example in the centimeter range, with substantially negligible attenuation. Theoretical considerations hereinafter set forth indicate that the Faraday rotation effect is dependent upon the existence of resonant frequencies in the magnetic material. Upon entering the magnetic material the impressed wave sets up two secondary waves each of which is circularly polarized and the direction of rotation of the plane of polarization is opposite in the two components. When the frequency of the impressed wave is remote from a resonance absorption frequency the two secondary wave components are constrained to travel through the magnetic material with unequal velocity. The relative difference in the velocities increases as the frequency of the impressed wave approaches the resonance frequency. In addition, if the impressed frequency is close to a resonance frequency, absorption takes place in the sense that energy from the resonant or nearly resonant wave component is transferred into heat or some other form of energy inside the material and if the resonance is substantially complete, one of the wave components may be thus completely absorbed, leaving the other component to traverse the magnetic material and emerge at the output of the system as a circularly polarized wave. Instead of changing the frequency of the impressed wave to increase absorption, it is possible to move the resonance frequency of the magnetic material by varying the magnetic field. In the microwave case, the magnetic resonance frequency is normally much lower than the frequency of the impressed wave but the resonance frequency may be brought up into the centimeter wave range by impressing rather large magnetizing fields. The elimination of one of the circularly polarized components results, of course, in a loss of approximately 3 decibels, although this is not excessive in view of certain advantages of securing a circularly polarized wave.

Figure 1:
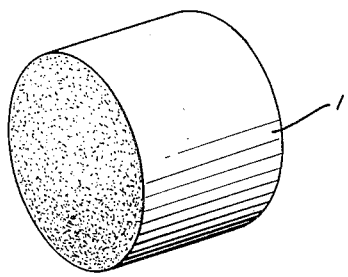
Fig. 1 is a perspective view of a piece of magnetic material useful singly or in combination as an embodiment of the invention.

Referring to Fig. 1, there is shown a block 1 of magnetic material, for example a piece of ferromagnetic metallic oxide, capable of transmitting electromagnetic waves and having a thickness of the order of magnitude of a wavelength, for example one centimeter, more or less, which has been found to operate satisfactorily as a directionally selective phase rotator for polarized electromagnetic waves. An element of this type which has been successfully used was made by powdering sintered nickel-zinc ferrite until the largest particles passed a 40-mesh screen, mixing this powder with small spheres of polystyrene which were fine enough also to pass a 40-mesh screen, in the proportion of 75% of volume of ferrite and 25% volume of polystyrene, then slightly wetting the mixture with a dilute solution of polystyrene in benzene to render the mixture tacky and pressing the material into a cylindrical form in a die under 5 tons pressure. By measuring the density before and after powdering it was estimated that the final compacted cylinder was approximately 60% nickel-zinc ferrite by volume. Before powdering, the nickel-zinc ferrite had been determined to have a saturation magnetization of approximately 2250 gauss and a resistivity of about ten million ohm-centimeters and hence the cylinder as formed would be expected to have a saturation magnetization of approximately 1350 gauss. The local conductivity, which is important at these frequencies, is probably unchanged by the powdering, but since the loss in polystyrene is negligible, the loss per centimeter thickness in the powdered cylinder should be only six-tenths of that in the original sintered nickel-zinc ferrite. Since mathematical analysis shows that the rotation per centimeter is approximately proportional to the saturation magnetization, no apparent advantage in degree of rotation is obtained by powdering. However, the tapered transition members (2 and 3 in Fig. 2) that were used to cut down reflections from the faces of the ferrite cylinder were made of polystyrene and it was advantageous to have the dielectric constant of the composite ferrite cylinder match that of the transition members as closely as possible. This match is considerably improved by the powdering and dilution technique discussed above.

In order to effect Faraday rotation, waves must be transmitted through a transparent isotropic medium parallel to the direction of the lines of force of the magnetic field. The effect may be conveniently produced by placing the medium along the axis of a solenoid. The rotation is designated as positive if it is in the direction of the positive electric current which produces the magnetic field and negative if in the opposite direction. It is believed that all transparent substances show the Faraday rotation. It was at one time thought that diamagnetic substances showed a positive rotation and ferromagnetic substances showed a negative rotation but this is now known to be incorrect. While not explicitly stated, a theory of the ferromagnetic Faraday effect can be derived from an article by D. Polder in Philosophical Magazine, volume 40, pages 99–115 (1949), in connection with an analysis of the gyromagnetic resonance in ferromagnetics involving precession of spinning electrons about the direction of an impressed magnetic field.

In the above-mentioned reference, Polder has shown that an electromagnetic wave being propagated in a ferromagnetic medium which is homogeneously magnetized in a direction parallel to the direction of propagation will split into positive and negative circularly polarized components which travel with different velocities in the medium.

In deriving his expressions, however, Polder assumed no damping of the electrons as they precess about the field direction. This assumption is probably valid at frequencies which are far removed from the resonance absorption frequency. In addition, however, Polder has tacitly assumed no dielectric loss as the wave is propagated through the ferromagnetic medium. Since appreciable dielectric loss occurs when microwaves are propagated through ferrites it is necessary to extend Polder's theory to include this case. In addition, Polder's theory is extended below to explain the ferromagnetic Faraday effect in the vicinity of the gyromagnetic resonance.

If an effective magnetic field, $H_0$, is applied in the Z direction, to a ferromagnetic medium, and if then a high frequency field is applied in an arbitrary direction, the relation between the periodic parts of B and H (namely $b$ and $h$) is given by the following equations:

$$b_x = \mu h_x - j\mu' h_y \quad (1)$$
$$b_y = j\mu' h_x + \mu h_y \quad (2)$$
$$b_z = h_z \quad (3)$$

where:

$$\mu = \frac{\gamma^2 H_0 B_0 - \omega^2}{\gamma^2 H_0^2 - \omega^2}$$

$$\mu' = \frac{4\pi M_0 \gamma \omega}{\gamma^2 H_0^2 - \omega^2}$$

$\gamma$ = gyromagnetic ratio for electrons
$\doteq 17.6 \times 10^6$ radians per second per oersted
$\omega$ = angular frequency of the incident wave in radians per second
$M_0$ = magnetization of medium.

If a plane electromagnetic wave is propagated through this medium in the Z direction it is necessary, in order to describe this wave, to find a set of solutions to Maxwell's equations which are consistent with the above set of Equations 1, 2, 3, and in which $b$, $h$, $E$, and $D$ are all proportional to $\exp(j\omega t - \Gamma Z)$.

It can be shown that the only possible solution under these conditions consists of either a positive or a negative circularly polarized wave for which the propagation constants are:

$$\Gamma_+ = \frac{j\omega}{c}\sqrt{\epsilon(\mu+\mu')} = \alpha_+ + j\beta_+ \quad (4)$$

and $$\Gamma_- = \frac{j\omega}{c}\sqrt{\epsilon(\mu-\mu')} = \alpha_- + j\beta_- \quad (5)$$

If Equations 4 and 5 are solved for the phase constants $\beta_+$ and $\beta_-$ the following result is obtained:

$$\beta_\pm = \frac{\omega}{c}\sqrt{\frac{\epsilon'+|\epsilon|}{2}}\sqrt{\mu \pm \mu'} \quad (6)$$

where $\epsilon = \epsilon' - j\epsilon''$ = a complex dielectric constant, and $|\epsilon|^2 = (\epsilon')^2 + (\epsilon'')^2$.

From this relation, one can obtain a real index of refraction for each component, given by $$n_\pm = \frac{c}{\omega}\beta_\pm = \sqrt{\frac{\epsilon'+|\epsilon|}{2}}\sqrt{1+\frac{4\pi M_0 \gamma}{\omega_0 \mp \omega}} \quad (7)$$

where $\omega_0 = \gamma H_0$.

Since the electromagnetic wave under discussion splits into two circularly polarized components which travel with different velocities in the ferromagnetic medium, the components will, upon emerging from the medium, unite to form a plane polarized wave in which the plane of polarization has been rotated through an angle $\theta$ while traveling through the medium, where $$\theta = \frac{l}{2}[\beta_- - \beta_+] \quad (8)$$

in which $l$ = path length through the ferromagnetic medium. By means of Equation 6 above, this can be written as $$\frac{\theta}{l} = \frac{\omega}{2c}\sqrt{\frac{\epsilon'+|\epsilon|}{2}}\left[\sqrt{1+\frac{4\pi M_0\gamma}{\omega_0+\omega}} - \sqrt{1+\frac{4\pi M_0\gamma}{\omega_0-\omega}}\right] \quad (9)$$

If the effective magnetic field within the ferromagnetic medium is small enough so that $$\omega_0 \ll \omega \quad (10)$$

Equation 9 can be written as $$\frac{\theta}{l} = \frac{\omega}{2c}\sqrt{\frac{\epsilon'+|\epsilon|}{2}}\left[\sqrt{1+\frac{4\pi M_0\gamma}{\omega}} - \sqrt{1+\frac{4\pi M_0\gamma}{\omega}}\right] \quad (11)$$

This can be further simplified when $$\frac{4\pi M_0 \gamma}{\omega} \ll 1 \quad (12)$$

to $$\frac{\theta}{l} = \frac{1}{2c}\sqrt{\frac{\epsilon'+|\epsilon|}{2}}(4\pi M_0 \gamma) \quad (13)$$

If we assume as reasonable representative values:

$4\pi M_0 = 1000$ gauss
$\epsilon' = 16$
$\epsilon'' = 0$

Equation 13 gives a rotation of $$\frac{\theta}{l} = 1.2 \text{ radians per centimeter}$$

$$\doteq 69 \text{ degrees per centimeter} \quad (14)$$

An important result of the foregoing analysis is that this relatively large rotation appears at frequencies greatly different from the resonance absorption frequency; and, if the conditions 10 and 12 obtain, the rotation as expressed in Equation 13 is seen to be independent of the frequency of the incident wave, and hence any device making use of this rotation would be broadband in its transmission characteristics. In addition, the rotation is proportonal to the magnetization of the sample. Below magnetic saturation, the magnetization is, of course, dependent upon the applied magnetic field, and hence, below saturation, the rotation is substantially proportional to the applied magnetic field.

If magnetic losses are included in the analysis, the theory also predicts that in the region where the frequency of the incident wave is close to the ferromagnetic resonance absorption frequency, the positive circularly polarized component is substantially completely absorbed while the negative component is propagated with attenuation only slightly different from that due to the usual dielectric losses. Hence, near the resonance absorption frequency the wave after transmission through the ferromagnetic medium is circularly polarized.

It has been experimentally confirmed that this theory does predict quantitatively the behavior of most ferrites up to saturation. In addition, I have obtained substantially circularly polarized waves by transmitting a plane polarized wave through a block of ferrite when the frequency of the wave was close to the resonance frequency. The accompanying transmission loss measured only slightly greater than 3 decibels, indicating that the negative component was being propagated with only slight attenuation while the positive component was being almost completely absorbed.

Figure 2:
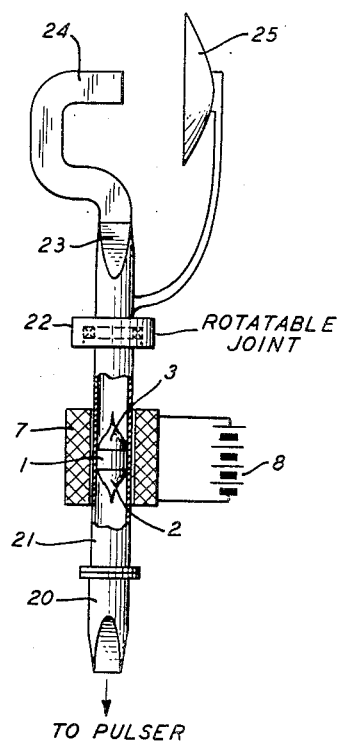
Fig. 2 is a view, partly in perspective and partly diagrammatical, showing a radar scanning system utilizing a piece of material such as shown in Fig. 1 in a wave guide system for microwaves.

Fig. 2 shows an arrangement in which the element of Fig. 1 is employed to transform a plane polarized wave into a circularly polarized wave and illustrates the use of the resulting circularly polarized wave in a scanning system employing a rotatable antenna.

In Fig. 2 there is shown a rectangular wave guide 20 which may be connected to a suitable pulser of a scanning system such as may be used in connection with a radar set. The wave guide section 20 merges into a circular section 21 containing the element 1, with its conical, polystyrene transition members 2 and 3, and surrounded by the solenoid 7 which is connected to the battery 8. The section 21, retaining its circular form without further transition is connected to a rotatable joint 22 which may in turn be connected through a circular to rectangular transition member 23 to a rectangular feeder wave guide 24 mounted at the focus of a reflector 25, the reflector being rigidly attached to the rotatable structure to rotate therewith.

In the operation of the system of Fig. 2 the potential of the source 8 is to be made sufficiently great to bring the magnetic resonance frequency of the element 1 into approximate agreement with the frequency of the waves impressed upon the wave guide 20. As a result the output wave of the section 21 is substantially circularly polarized. The circularly polarized wave is capable of energizing the rectangular guide 24 to develop a substantially uniform flow of power, regardless of the direction in which the reflector 25 is facing at any particular time. This is so because the rate of rotation of the electric vector in the circularly polarized wave is governed by the microwave frequency which is very high compared to the rate of rotation of the scanning system, so that power variations due to the rotation are not perceptible. Were the original plane polarized wave fed to the guide 24, power fluctuations would occur at a rate governed by the rate of rotation of the scanning system. This latter rate, being much less can cause undesirable fluctuations in the transmitted signal intensity.

It will be evident that the transition members 2 and 3 may advantageously be made of ferrite of the same composition as the element 1, thereby tending further to reduce reflections, while the transition members themselves then also contribute to the amount of Faraday rotation produced. Also the transition members 2 and 3 and the element 1 may be combined into a single member.

In any of the embodiments of the invention illustrated, the element 1 may be replaced by a container of gas or liquid or by material in solid form other than ferrite, the choice of material being limited only by the presence of a proper resonance absorption frequency for the material not too far removed from the desired frequency of the incident waves. Among suitable materials are gases trapped in a clathrate molecular structure, as gas so trapped is equivalent to ordinary gas at enormous pressure and great density and is capable of producing large Faraday rotations in a wave guide of reasonable length. Since it has been demonstrated that the rotation is proportional to the magnetization and not to the applied magnetic field, it is also obvious that the solenoid can be dispensed with if a suitable ferromagnetic material is used which can be permanently magnetized.

It is to be understood that the above-described arrangements are illustrative of the application of the principles of the invention. Numerous other arrangements may be devised by those skilled in the art without departing from the spirit and scope of the invention.

What is claimed is:

1. A mode converter for converting between plane polarized waves and circularly polarized waves, comprising an element of ferromagnetic material, means for directing a magnetic field into said element for exciting gyromagnetic resonance in said element, polarization selective input means for impressing linearly polarized waves upon said element having a direction of propagation parallel to said field, the strength of said field being such that gyromagnetic resonance is produced and the linearly polarized waves are converted to circularly polarized waves, and polarization indifferent output means coupled to said element to propagate said circularly polarized waves.

2. A mode converter in accordance with claim 1 in which the element comprises a ferromagnetic metallic oxide.

3. A mode converter in accordance with claim 1 in which the element comprises a ferrite.

4. A mode converter in accordance with claim 1 in which the element comprises particles of finely divided magnetizable material combined with a dielectric binder.

References Cited in the file of this patent

UNITED STATES PATENTS

| 1,773,981 | Farnsworth | Aug. 26, 1930 |
| 2,051,537 | Wolff et al. | Aug. 18, 1936 |
| 2,398,096 | Katzin | Apr. 9, 1946 |
| 2,402,948 | Carlson | July 2, 1946 |
| 2,461,005 | Southworth | Feb. 8, 1949 |
| 2,477,510 | Chu | July 26, 1949 |
| 2,514,679 | Southworth | July 11, 1950 |
| 2,532,157 | Evans | Nov. 28, 1950 |
| 2,607,849 | Purcell et al. | Aug. 19, 1952 |
| 2,644,930 | Luhrs | July 7, 1953 |

FOREIGN PATENTS

| 592,224 | Great Britain | Sept. 11, 1947 |

OTHER REFERENCES

Hewitt: "Microwave Resonance Absorption in Ferromagnetic Semiconductors," Physical Review, vol. 73, No. 9, May 1, 1948, pages 1118–19.

Miller: "Magnetically Controlled Wave-Guide Attenuators," Journal of Applied Physics, vol. 20, issue No. 9, pages 878–883, September 1949.

Philips: Technical Review, May 1950, volume 11, No. 11, pages 313–340, page 318 relied on. (Copy in Scientific Library.)